US008601578B1

(12) United States Patent
Gertzenstein et al.

(10) Patent No.: US 8,601,578 B1
(45) Date of Patent: Dec. 3, 2013

(54) IDENTIFYING POTENTIALLY SUSPICIOUS BUSINESS LISTINGS FOR MODERATION

(75) Inventors: Diego Ariel Gertzenstein, Sudbury, MA (US); Paul Eastlund, Mamaroneck, NY (US); Elizabeth Hamon Reid, Secaucus, NJ (US)

(73) Assignee: Google Inc., Mountain View, CA (US)

( * ) Notice: Subject to any disclaimer, the term of this patent is extended or adjusted under 35 U.S.C. 154(b) by 87 days.

(21) Appl. No.: 13/010,213

(22) Filed: Jan. 20, 2011

(51) Int. Cl.
H04L 29/06 (2006.01)

(52) U.S. Cl.
USPC ......... 726/22; 726/1; 726/2; 726/26; 713/155

(58) Field of Classification Search
USPC .......................... 713/155; 726/12, 22, 25, 26
See application file for complete search history.

(56) References Cited

U.S. PATENT DOCUMENTS

| | | | | |
|---|---|---|---|---|
| 5,630,123 | A * | 5/1997 | Hogge | 718/103 |
| 6,772,347 | B1 * | 8/2004 | Xie et al. | 726/11 |
| 7,493,650 | B2 * | 2/2009 | Peled et al. | 726/1 |
| 7,530,106 | B1 * | 5/2009 | Zaitsev et al. | 726/24 |
| 8,352,511 | B2 | 1/2013 | Erickson | |
| 2001/0052087 | A1 * | 12/2001 | Garg et al. | 714/37 |
| 2005/0065928 | A1 * | 3/2005 | Mortensen et al. | 707/5 |
| 2006/0101021 | A1 * | 5/2006 | Davis et al. | 707/9 |
| 2007/0265902 | A1 * | 11/2007 | Brennen et al. | 705/8 |
| 2007/0283194 | A1 * | 12/2007 | Villella et al. | 714/57 |
| 2010/0313266 | A1 * | 12/2010 | Feng et al. | 726/23 |
| 2011/0010326 | A1 * | 1/2011 | Neale et al. | 706/47 |

* cited by examiner

*Primary Examiner* — Hadi Armouche
*Assistant Examiner* — Christopher C Harris
(74) *Attorney, Agent, or Firm* — Lerner, David, Littenberg, Krumholz & Mentlik, LLP (57) ABSTRACT

A business listing verification server is operative to verify whether a business listing complies with a selected business configuration rule. The business listing verification server may include a business listing database comprising a plurality of business listings and a business information source pipeline for processing the various business listings. The business listing verification server may further include a set of business listing configuration rules, wherein each business listing configuration rule may be established for a separate business. A business listing configuration rule may establish whether a business listing is a potentially suspicious business listing. In addition, the business listing verification server may also include a moderation priority queue, where business listings to be moderated are prioritized based on whether the business listings have been identified as potentially suspicious business listings according to one or more business listing configuration rules.

18 Claims, 6 Drawing Sheets

IDENTIFYING POTENTIALLY SUSPICIOUS BUSINESS LISTINGS FOR MODERATION

BACKGROUND

In deciding where to go shopping, people often turn to the Internet to look up nearby businesses. For example, people may look up a business's phone number, address, or other business information. This type of business information for a business may constitute a business listing. Although a business may provide their own business listing, an online service provider may aggregate a number of business listings to enable an end user to search through the business listings more expeditiously and to locate various businesses quickly.

However, an online service provider faces a number of challenges in providing business listings to the Internet-savvy user. One challenge is to avoid providing a business listing that is incomplete. For example, the provided business listing may be lacking in a phone number, street address, or other business information. Another challenge is to avoid providing a business listing for a business that has since gone out of business. For example, retail chain business often have multiple business locations in a given area and, at any time, one of these business locations may go out of business. However, even when a particular business location goes out of business, the business listing for that now out-of-business location may still persist. Hence, when the online service provider provides the business listing for the now out-of-business business location, the end user, upon visiting the actual location of the business, will find that the business is no longer there.

Another challenge is to avoid providing business listings established by competitors that masquerade as business listings for another business. For example, Business A may establish a business listing that appears to be for Business B but, in fact, the business listing provides an address for a business location of Business A. These types of business listings harm the end user because the end user may prefer to shop at Business A rather than at Business B.

BRIEF SUMMARY

An apparatus for identifying potentially suspicious business listings for moderation is disclosed. In one embodiment, the apparatus may include a memory operative to store a business listing database comprising a plurality of business listings and a plurality of business listing configuration rules, each business listing configuration rule establishing whether a business listing is to be treated as a suspicious business listing. The apparatus may also include a processor in communication with the memory, the processor being operative to evaluate the selected business listing from the plurality of business listings with the plurality of business listing configuration rules and determine whether the selected business listing complies with a selected one of the plurality of business listing configuration rules. The processor may also be operative to identify the selected business listing as a potentially suspicious business listing when the business listing does not comply with the selected one of the plurality of the business listing configuration rules.

In another embodiment of the apparatus, the processor is further operative to update a moderation priority queue when the selected business listing is identified as a potentially suspicious business listing.

In a further embodiment of the apparatus, the processor is further operative to assign the selected business listing a new business listing problem when the business listing is identified as being a potentially suspicious business listing but has not been previously assigned a business listing problem, remove the selected business listing from the business listing database when the selected business listing is not identified as being suspicious but has been previously assigned the business listing problem, and maintain the previously assigned business listing problem with the selected business listing when the business listing is identified as being the potentially suspicious business listing and the selected business listing was previously assigned the previously assigned business listing problem.

In yet another embodiment of the apparatus, the processor is further operative to prioritize the selected business listing for moderation based on the assigned business listing problem to the selected business listing.

In yet a further embodiment of the apparatus, the selected one of the plurality of business listing configuration rules comprises a business matching expression for matching a business listing and the processor is further operative to determine that the selected business listing is to comply with the selected business listing configuration rule when the selected business listing matches the business matching expression of the selected business listing configuration rule.

In another embodiment of the apparatus, the selected business listing configuration rule comprises a source location and the processor determines the selected business listing does not comply with the selected business listing configuration rule when the business listing does not include the source location of the selected business listing configuration rule.

In a further embodiment of the apparatus, the selected one of the business listing configuration rules includes a threshold and the processor is further operative to transmit a threshold alert when a plurality of business listings having been identified as being potentially suspicious business listings exceed the threshold.

In yet another embodiment of the apparatus, the threshold is a number of business listings that have been identified as being potentially suspicious business listings.

In yet a further embodiment of the apparatus, the threshold is a percentage of business listings that have been identified as being potentially suspicious business listings.

In another embodiment of the apparatus, the threshold alert signifies that the selected business listing configuration rule is to be reviewed by a moderator.

A method for identifying potentially suspicious business listings for moderation is also provided. In one embodiment, the method may include storing, in a memory, a business listing database comprising a plurality of business listing, establishing, in the memory, a plurality of business listing configuration rules, wherein each rule establishes whether a business listing is a trusted business listing, and evaluating, with the processor, a selected business listing of the plurality of business listings with the plurality of business listing configuration rules. The method may also include determining whether the selected business listing complies with a selected one of the plurality of business listing configuration rules, and identifying the selected business listing as a potentially suspicious business listing when the selected business listing does not comply with the selected one of the plurality of the business listing configuration rules.

In another embodiment of the method, the method further comprises updating a moderation priority queue when the selected business listing is identified as a potentially suspicious business listing.

In a further embodiment of the method, the method further comprises assigning the selected business listing a new business listing problem when the selected business listing is identified as being a potentially suspicious business listing but has not been previously assigned a business listing problem, removing the selected business listing from the business listing database when the selected business listing is not identified as being suspicious but has been previously assigned the business listing problem, and maintaining the previously assigned business listing problem with the selected business listing when the selected business listing is identified as being the potentially suspicious business listing and the selected business listing was previously assigned the previously assigned business listing problem.

In yet another embodiment of the method, the method further comprises prioritizing the selected business listing for moderation based on the assigned business listing problem to the selected business listing.

In yet a further embodiment of the method, the selected one of the plurality of business listing configuration rules comprises a business matching expression for matching a business listing, and the method further comprises determining that the selected business listing is to comply with the selected business listing configuration rule when the selected business listing matches the business matching expression of the selected business listing configuration rule.

In another embodiment of the method, the selected business listing configuration rule comprises a source location, and the method further comprises determining that the selected business listing does not comply with the selected business listing configuration rule when the selected business listing does not include the source location of the selected business listing configuration rule.

In a further embodiment of the method, the selected one of the business listing configuration rules includes a threshold, and the method further comprises transmitting a threshold alert when a plurality of business listings having been identified as being potentially suspicious business listings exceeds the threshold.

In yet another embodiment of the method, the threshold is a number of business listings that have been identified as being potentially suspicious business listings.

In yet a further embodiment of the method, the threshold is a percentage of business listings that have been identified as being potentially suspicious business listings.

In another embodiment of the method, the threshold alert signifies that the selected business listing configuration rule is to be reviewed by a moderator.

DETAILED DESCRIPTION

Figure 1:
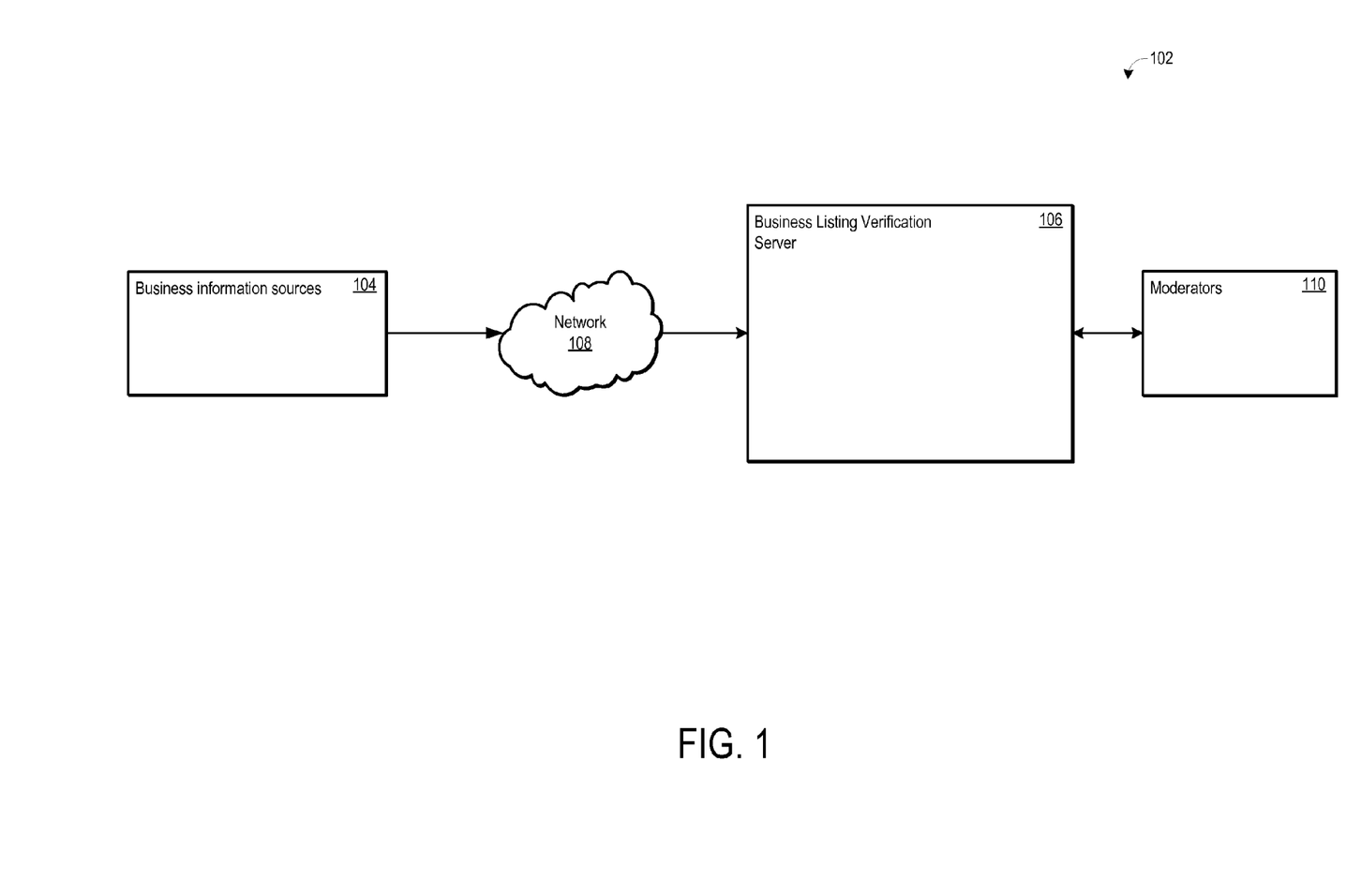
FIG. 1 illustrates one example of an apparatus for identifying potentially suspicious business listings according to aspects of the invention.

FIG. 1 illustrates one example of an apparatus 102 for identifying potentially suspicious business listings. The apparatus 102 may include a business listing verification server 106 in communication with business information sources 104 and one or more moderators 110.

The business information sources 104 may include any number and/or type of business information sources. For example, the business information sources 104 may include webpages, Internet users, Internet service providers, Internet business providers (e.g., providers of online shopping, searching, etc.), or any other type of business information source.

The business information sources 104 may provide the business information to the business listing verification server 106 actively, passively, or a combination thereof. An example of actively providing business information would be where an Internet user provides the business information to a business listing service, such as a restaurant review service, and the restaurant review service has asked the Internet user for information about the restaurant to be listed or reviewed. The restaurant review service may then communicate the business information received from the user to the business listing verification server 106. An example of passively providing business information would be where the business listing verification server 106 is in communication with an Internet search engine, and the Internet search engine indexes the business information from the webpage. As the Internet search engine is indexing the webpage, the business listing verification server 106 may organize the received business information into a new business listing.

The business information sources 104 may be external to the business listing verification server 106. In one embodiment, the business information sources 104 may communicate with the business listing verification server 106 through one or more privately or publicly accessibly networks 108. For example, the business listing verification server 106 may operate on a privately accessible network, such as a local area network of a business, in communication with a publicly accessible network, such as the Internet. In this instance, a business information source 104 may be external to the business information verification server 106 when the business information source 104 does not reside on the same privately accessible network as the business information verification server 106. In more general terms, a business information source may be external where the reliability of the business information source is valued less than other business information sources.

The business information provided by a business information source 104 may be any type of information about a business. The business information may include the business's name, address, geographic location, geographic area of service, business type, number of employees, names or contact information of employees, or any other type of business information. Moreover, the business information provided by the business information sources 104 may be incomplete, such that the business information sources 104 may provide the business's name, but fail to provide the business's address or other business information. The business information verification server 106 may also fill in the gaps in business information as it gathers the business information from additional external (or internal) business information sources 104. As discussed below, as additional business information for a business is gathered, the business information verification server 106 may update a business listing for the business with the updated and/or additional business information.

The business information verification server 106 may also be in communication with one or more moderators 110. As the business information verification server 106 receives new and/or updated business information for a business listing, the business information verification server 106 may update or create a business listing, and then prioritize the updated and/or created business listings based on whether business listing is a potentially suspicious business listing. One or more moderators 110, which may be human moderators, may have access to the prioritized business listings such that a moderator may moderate the prioritized business listing. A moderator need not moderate every business listing maintained by the business information verification server 106, but rather, moderate those business listings that have been accordingly prioritized. The details of identifying a business as a potentially suspicious business listing and prioritizing a business listing are discussed with reference to FIGS. 5A-B.

Figure 2:
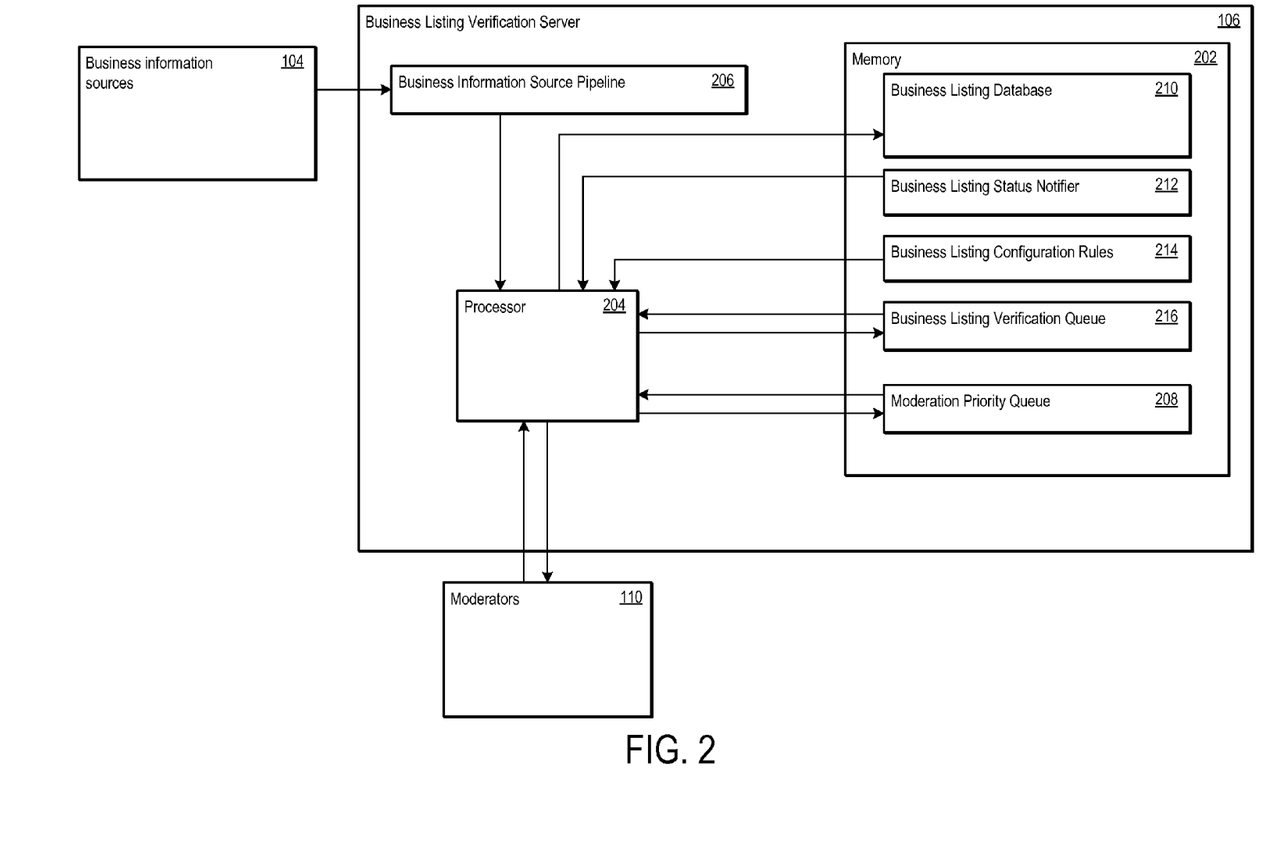
FIG. 2 further illustrates the apparatus of FIG. 1 according to aspects of the invention.

FIG. 2 illustrates one example of a business information verification server 106 operative to identify business listings as potentially suspicious business listings. In one embodiment, the business information verification server 106 may include a memory 202, a processor 204, a business information source pipeline 206, a business listing verification queue 216, and a moderation priority queue 208.

The memory 202 is operative to store a business listing database 210, a business listing status notifier 212, and one or more business configuration rules 214. The business listing database 210 is operative to store a plurality of business listings. The business listings stored in the business listing database 210 may contain the business information previously mentioned, such as a business name, a business address, a business phone, or any other business information. Moreover, the business listing database 210 may include one or more incomplete business listings, where the business information verification server 106 updates the one or more incomplete business listings as the business information verification server 106 gathers additional business information from business information sources 104.

The business information source pipeline 206 is operative to receive business information from the one or more business information sources 104. The business information received by the business information source pipeline 206 may be raw data, that is, information about a business that has not yet been identified as such. For example, the raw data may include a business telephone number, but the business telephone number may not have been identified as such and the business listing verification server 106 may merely view the business telephone number as a series of characters and/or digits. The processor 204 may be operative to organize the business information received from the business information sources 104 into one or more business listings suitable for the business listing database 210.

While receiving business information from the business information sources 104, the processor 204 may be operative to identify the source of the business information. For example, where the business information is obtained from a website, the processor 204 may be operative to identify that the business information was obtained from that website when the processor 204 prepares the business listing. In one embodiment, the processor 204 may be operative to identify the source as a Uniform Resource Location ("URL"). Moreover, where the business listing verification server 106 receives business information about a business from multiple sources, the processor 204 may be operative to identify that the business listing for the business was compiled from multiple sources.

In identifying a source of business information, the processor 204 may include or associate an identifier with a source of business information. The identifier may be unique to the business information source. Hence, each business information source may be associated with a unique identifier. The identifier may be any sequence of alphanumeric characters or other series of characters.

In another embodiment of assigning identifiers, the processor 204 may include an authoritative source identifier and a providing source identifier in the business listing. The authoritative source identifier is used to identify the source from where the business information originated. The providing source identifier may identify the source from where the business information was provided. For example, a business information aggregator may aggregate business information from a number of sources and the business information aggregator may provide the business information to the business listing verification server 106. As another example, a providing source and an authoritative source may be the same source, such as where the business listing verification server 106 receives business information directly from the business described in the business information.

The authoritative source identifier and/or the providing source identifier may be generated by the processor 204 and may comprise a plurality of alphanumeric characters. In one embodiment, the authoritative source identifier and/or the providing source identifier may be generated using a hash function, such as an MD5 or SHA-1 hash function. For example, where the processor 204 identifies the providing source of the business information as a URL, the URL may be passed to the hash function to yield the hash as the providing source identifier. In another embodiment, the processor 204 may assign a pre-determined authoritative source identifier and/or a pre-determined providing source identifier to the business listing. For instance, the processor 204 may communicate with a source identifier database (not shown) that stores one or more source identifier records that correlate authoritative source identifiers and/or providing source identifiers with various sources. When the processor 204 receives the business information and identifies the providing source and/or authoritative source of the business information, such as by referring to a URL or the like, the processor 204 may assign the pre-determined providing source identifier and/or the pre-determined authoritative source identifier based on correlating the identified source with the pre-determined source identifier. A combination of these techniques are also possible, such that the processor 204 associates a URL of the authoritative source as the authoritative source identifier and an MD5 or SHA-1 hash of the URL for the providing source as the providing source identifier.

The business listing status notifier 212 is operative to notify the processor 204 that the business listing database 210 has been updated with additional or updated business information regarding a new or previously existing business listing. In one embodiment, the business listing status notifier 212 may be an index status file for the business listing database 210 that informs the processor 204 that an update for a business listing has occurred. Based on a change in status of the business listing status notifier 212, the processor 204 may then determine whether one or more business listings comply with the business configuration rules 214.

The business configuration rules 214 may establish whether a business listing is to be treated as a suspicious business listing. In one embodiment, a business configuration rule may include one or more identifiers for identifying whether a business listing is to be treated as a suspicious business listing. The identifiers may include a business name identifier, a business matching expression, a source location, a source type, and a providing source identifier. The business configuration rule may also include one or more thresholds that the processor 204 may use in ascertaining whether a moderator should review the business configuration rule.

The business name identifier may identify the name of the business to which the business configuration rule applies. For example, the business name identifier may be the formal name of a business, such as "Bed Bath & Beyond," "Ikea," "Vitamin Shoppe," or any other business name.

The business matching expression may establish how the processor 204 is to determine which business configuration rules are to apply to which business listings. In one embodiment, the business matching expression may be a regular expression that the processor 204 parses to match with business names associated with corresponding business listings. Should the business name associated with a corresponding business listing match the business matching expression, the processor 204 may then determine whether the corresponding business listing complies the business configuration rule.

The source location may identify one or more sources from which the business listing verification server 106 may receive business information. The source location may include one or more URLs that identify authoritative websites from which business information should originate. In one embodiment, the processor 204 may compare the source location(s) with the authoritative source identifier of a business listing to determine whether the business information of the business listing originated with the source identified by the source location. In this embodiment, when the processor 204 determines that the business information of the business listing does not contain the source location, such as where the business listing may be lacking in an authoritative source identifier, the processor 204 may determine that the business listing does not comply with the business configuration rule.

The business configuration rule may also include a source type for the source identified by the source location. The source type may identify whether the source is a trusted or non-trusted source. Where the business configuration rule establishes that the source type is a trusted source and the processor 204 determines that a business listing to which the business configuration rule was applied lacks the authoritative source identified by the source location, the processor 204 may identify the business listing as a potentially suspicious business listing. To compare, where the business configuration rule establishes that the source is a non-trusted source and the processor 204 determines that the business listing to which the business configuration was applied contains the authoritative source identified by the source location, the processor 204 may also identify the business listing as a potentially suspicious business listing.

The providing source identifier of the business configuration rule identifies a providing source of business information. As mentioned above, a providing source of business information and a source location may not be the same source. For example, a providing source of business information may be a business information aggregator that aggregates business information from multiple source locations. The providing source identifier may be a series of alphanumeric characters. In one embodiment, the providing source identifier may be generated by the processor 204 using a hash function, such as an MD5 or SHA-1 hash function, where the input to the hash function is a URL of the providing source. In another embodiment, the providing source identifier may be retrieved by the processor 204 from a providing source database (not shown) that correlates the providing source identifiers with providing sources.

The processor 204 may compare the providing source identifier of the business configuration rule with the providing source identifier of the business listing. In some instances, the business listing may match the business matching expression of different business configuration rules. In this case, the processor 204 may compare the providing source identifier of the business configuration rule with the providing source identifier of the business listing. Where the providing source identifiers of the business listing and the business configuration rule match, the processor 204 may determine whether the business listing contains the corresponding source location. Comparing the providing source identifiers may ensure that the processor 204 does not inadvertently identify a business listing as a potentially suspicious business listing as different providing sources of business information may have different authoritative/originating sources of business information. Where the business listing lacks a providing source identifier, the processor 204 may determine whether the business complies with any of the matching business configuration rules. Should the processor 204 determine that the business listing does not comply with any of the matching business configuration rules, the processor 204 may then identify the business listing as a potentially suspicious business listing.

The business configuration rules may also include various thresholds to be used in ascertaining whether a moderator should review a business configuration rule. In one embodiment, a business configuration rule may have a threshold representing a percentage of the number of business listings that were identified as being potentially suspicious business listings based on an evaluation of the business configuration rule. For example, where the business configuration rule has a threshold of 80% and 90 out of 100 business listings were identified as being potentially suspicious business listings, the processor 204 may transmit an alert that notifies one or more moderators that the business configuration should be reviewed. In another embodiment, the business configuration rule may have as a threshold an absolute number of business listings that were identified as being potentially suspicious business listings based on an evaluation of the business configuration rule. In this example, where the business configuration rule has a threshold of 50, and 53 out of 62 business listings were identified as being potentially suspicious business listings, the processor 204 may transmit an alert that notifies one or more moderators that the business configuration should be reviewed. A business configuration rule may also have both types of thresholds. The threshold(s) of the business configuration rule may assist moderators in ascertaining whether there is a problem with the business configuration rule itself rather than the business listing.

Table 1 below provides several examples of business configuration rules. As discussed above, each business configuration rule may include a business name identifier, a business matching expression, a source location, a source type, a providing source identifier, and one or more thresholds.

TABLE 1

| Business Configuration Rule Number | Business Configuration Rule |
|---|---|
| 1 | Bed Bath & Beyond, Bed\sBath\s(?:&\|And)\sBeyond, bedbathandbeyond.com, FEED:TRUSTED, 584400111348,80% |
| 2 | Ikea , Ikea, ikea.com \| ikea-usa.com, FEED:TRUSTED,355813511621,75 |
| 3 | Vitamin Shoppe,(?:The\s)?Vitamin\sShoppe, vitaminshoppe.com,FEED:TRUSTED,248549723719, 80%,75 |

Using business configuration rule number 1 as an example, the business configuration rule has a business name identifier of "Bed Bath & Beyond", a business matching expression of "Bed\sBath\s(?:&|And)\sBeyond", a source location of "bed-bathandbeyond.com", a source type of "TRUSTED", a providing source identifier of "584400111348", and a threshold of 80% of business listings as being identified as potentially suspicious based on this business configuration rule. From Table 1, business configuration rule numbers 2 and 3 have similar structures. However, business configuration rule number 2 has a threshold of 75 business listings as being identified as potentially suspicious based on this business configuration rule and business configuration rule number 3 has two thresholds, one of 80% and one of 75 business listings as being identified as potentially suspicious, either of which may be satisfied.

Figure 3:
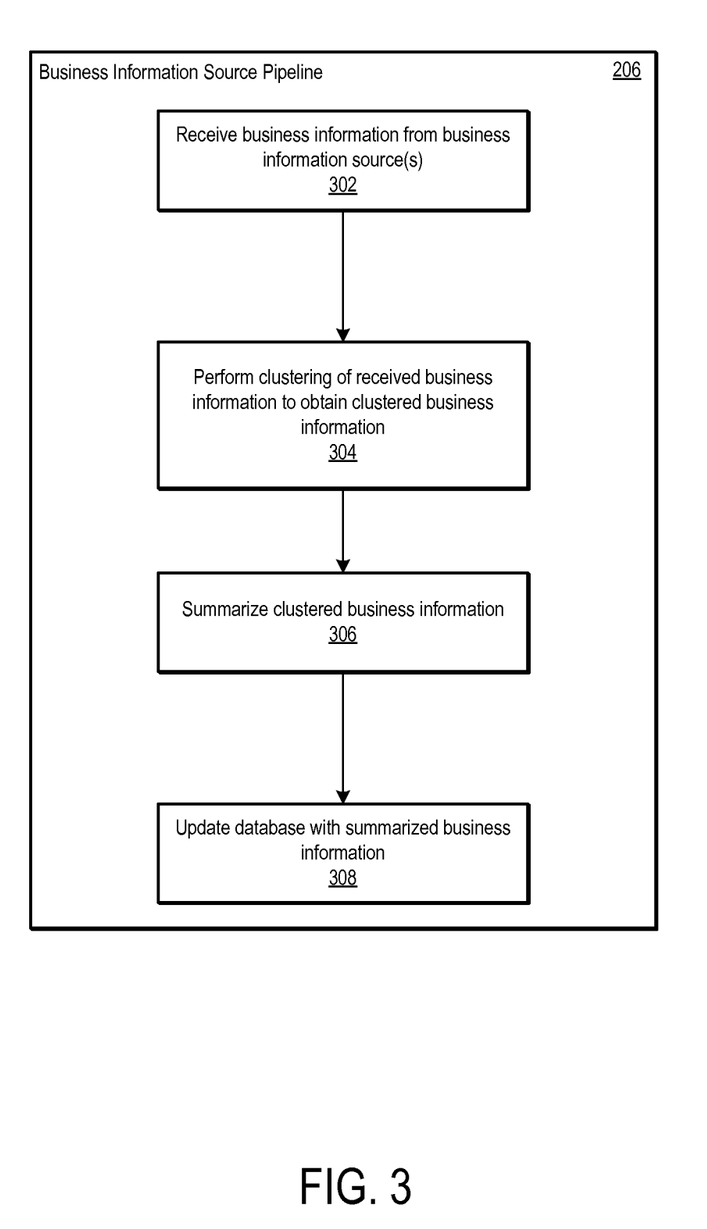
FIG. 3 illustrates one example of a business information source pipeline for organizing received business information according to aspects of the invention.

FIG. 3 is example of the business information source pipeline 206 for organizing the business information received from the business information sources 104, regardless of whether the business information sources are providing information sources or authoritative information sources. Initially, the business listing verification server 106 receives the business information from the business information source (Block 302). Thereafter, the processor 204 may perform clustering of the received business information to obtain initial or rudimentary business listings (Block 304). The received business information may be clustered based on one or more business attributes, such as the business name, the geographical location of the business, the postal address of the business, the phone number for the business, or any other attribute or combination of attributes.

The processor 204 may then summarize the clustered business information to obtain summarized business information and/or one or more business listings (Block 306). In one embodiment, summarizing the clustered business information may include identifying which of the business attributes of the business information is most accurate or is likely to be accurate for the business. For example, during the summarizing process, the processor 204 may identify that two slightly different phone numbers are associated with a business. In this example, the processor 204 may identify one of the two phone numbers as being more accurate. The identification of the more accurate phone number may be based on a number of factors, such as the source of the business information, whether the phone number aligns with the postal address of the business, or any other factor or combination of factors. Hence, in this manner, the processor 204 is operative to organize potentially conflicting or duplicate data about a business into a business listing.

The processor 204 may then update the business listing database 210 with the summarized business information (Block 308). In some instances, updating the business listing database 210 may include updating information for a prior existing business listing; in other instances, updating the business listing database 210 may include creating a new business listing.

Upon the occurrence of an event, the processor 204 may evaluate business listings stored in the business listing database 210 using one or more business listing configuration rules 214. In one embodiment, the event may be the lapsing of a predetermined time period, such as one month, one year, or other time period.

In another embodiment, the processor 204 may evaluate aggregated business listings on a weekly basis. In this embodiment, evaluation of the aggregated business listings may also include processing of business information source via the business information source pipeline 206 (i.e., clustering and summarizing), updating the business listing database 210, and evaluating clustered business listings, summarized business listings, and finalized business listings against one or more business listing configuration rules 214.

In another embodiment, the event may be when the business listing database 210 has been updated a predetermined number times, such as when the business listing database 210 exceeds ten updates. The business listing status notifier 212 may be operative to notify the processor 204 the number of times the business listing database 210 has been updated or whether an update threshold has been exceeded. In yet another embodiment, the event may be when the processor 204 is receiving business information from the business information pipeline 206.

When the event occurs, the processor 204 may retrieve each of the business listings from the business listing database 210. Each of the business listings may then be passed to the business listing verification queue 216. For each business listing in the business listing verification queue 216, the processor 204 may evaluate one or more of the business listing configuration rules 214 to determine whether the business listing is a potentially suspicious business listing. In one embodiment, a business listing is identified as a potentially suspicious business listing when the business listing is lacking an authoritative source identifier or where the authoritative source identifier differs from the source location of a matching business listing configuration rule.

In another embodiment, the processor 204 may retrieve previously clustered business information corresponding to the business listing to determine whether the business listing complies with a business listing configuration rule 214. The processor 204 may retrieve the previously clustered business information and/or the previously summarized business information because the previously clustered business information and the previously summarized business information may represent unabridged business information, whereas a business listing in the business database 210 may represent a reduced set of the original amount of business information that the business listing verification server 106 originally received. Hence, the previously clustered business information for a business listing may contain information not present in the business listing database 212.

In this embodiment, a business listing and/or a business listing cluster may be identified as potentially suspicious when the business listing and/or the business listing cluster matches one or more attributes of a business listing configuration rule, such as the business name identifier, the business matching expression, etc., but none of the business listings from which the business listing cluster was clustered have an authoritative source identifier or are from an authoritative source. The processor 204 may perform this evaluation for each of the business listings in the business listing database 210 and for each business listing configuration rule in the set of business listing configuration rules 214.

When a business listing is identified as a potentially suspicious business listing, the processor 204 may transfer the business listing to the moderation priority queue 208 for moderation by one or more moderators 110. In addition, the potentially suspicious business listing may be associated with a problem report identifying that the potentially suspicious business listing may be problematic or may falsely identify a business.

The moderation priority queue 210 is operative to store business listings to be moderated. The processor 204 may assign a moderation priority to the one or more business listings residing in the moderation priority queue 210. The moderation priority assigned to each of the business listings may indicate in which order the business listings are to be moderated by the one or more moderators 110. As discussed below, the moderation priority may be based on one or more business listing problems assigned to a business listing.

Each of the business listings in the moderation priority queue 208 may be associated with one or more business listing problems. A business listing problem may identify that the business listing has a problem. For example, the business listing problem may identify that the business listing has false or deficient business information, that the business listing does not have an authoritative source identifier or a misidentified authoritative source identifier, or other business listing problem. A business listing problem may also include user-identified problems, such as where a user has complained that the business listing is inaccurate. In addition, a business listing may be associated with one or more previously assigned business listing problems, such as where the business listing was previously moderated but not removed from the business listing database 210. The number of business listing problems associated with a particular business listing may increase the priority of the business listing for moderation. Hence, a business listing that has 5 business listing problems may be prioritized higher than a business listing that has 3 business listing problems. Moreover, the severity of a business listing problem may increase the priority of a business listing, such as where the business listing problems are weighted.

In one embodiment, the processor 204 may perform one or more actions on a business listing in the moderation priority queue 208 based on whether the business listing has been assigned a business listing problem. For example, the processor 204 may assign the business listing a business listing problem when the business listing is identified as being a potentially suspicious business listing but has not been previously assigned a business listing problem. As another example, the processor 204 may maintain a previously assigned business listing problem with the business listing when the business listing is identified as being a potentially suspicious business listing and the business listing was previously assigned the previously assigned business listing problem.

In addition, the processor 204 may perform an action on the business listing after the business listing has left the business verification queue 216. For example, the processor 204 may remove the business listing from the business listing database 210 when the business listing was not identified as being suspicious but had been previously assigned a business listing problem. As described in the foregoing, the actions performed on the business listing may occur prior to moderation, during moderation, after moderation, or any other time in-between.

By determining whether a business listing has a previously assigned business listing problem or whether to assign a business listing problem to a business listing, the processor 204 may reduce the likelihood that a business listing will be overly moderated or moderated more than once. Accordingly, this methodology may reduce the time that moderators 110 spend moderating business listings and may increase their overall efficiency.

Figure 4:
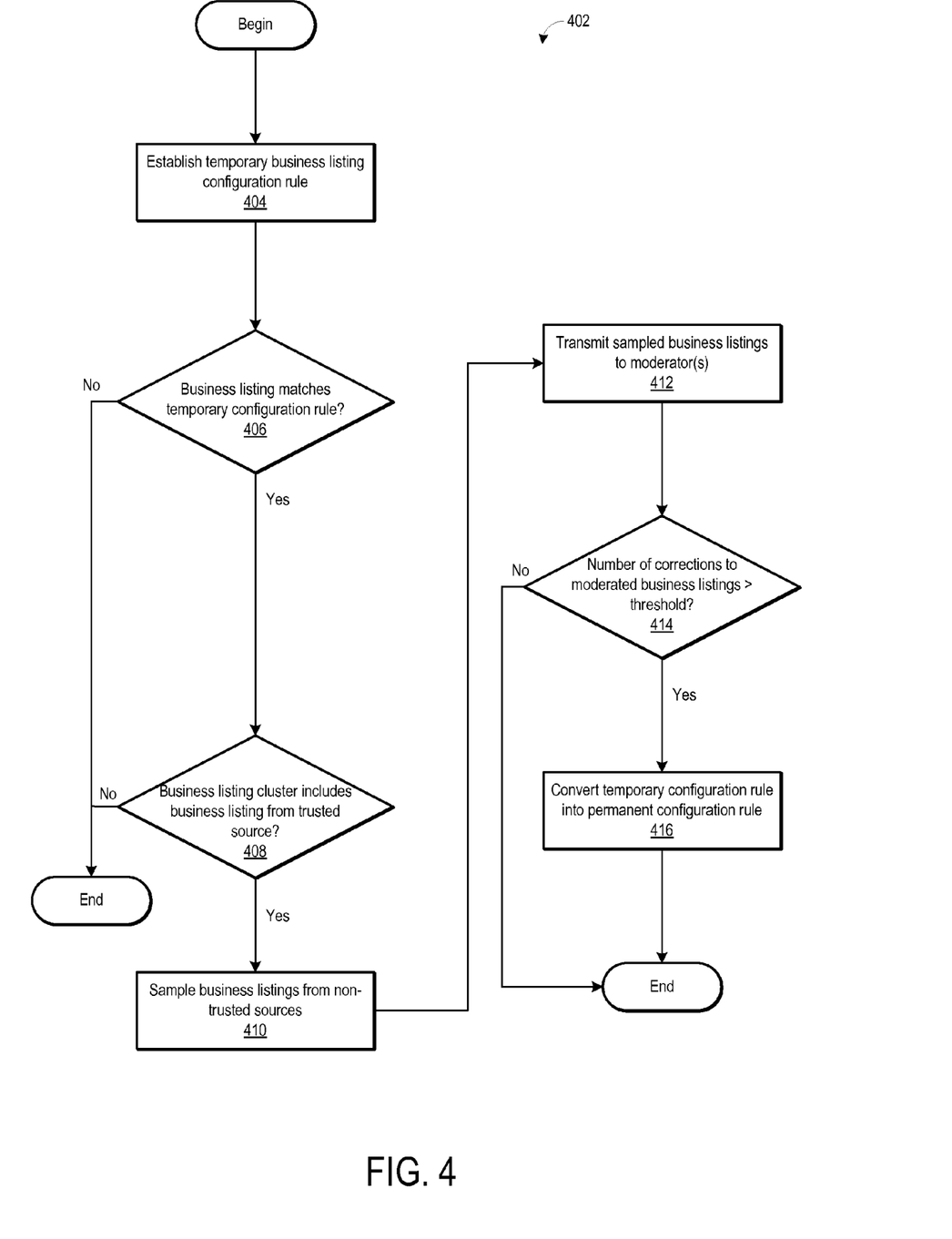
FIG. 4 illustrates one example of logic flow establishing a new business listing configuration rule according to aspects of the invention.

FIG. 4 illustrates one example of logic flow 402 for establishing a new business listing configuration rule. Initially, a user or moderator 110 may prepare a temporary business listing configuration rule (Block 404). This temporary business listing configuration rule will be used by the processor 204 to evaluate one or more business listings. The results of this evaluation may then be used to determine whether to convert the temporary business listing configuration rule into a permanent business listing configuration rule.

For each business listing that the processor 204 uses to evaluate the temporary business listing configuration rule, the processor may retrieve the previously clustered business information for the business listing. The processor 204 may then determine whether the business listing cluster matches the business matching expression of the temporary business listing configuration rule (Block 406). Where the business listing cluster matches the business matching expression, the processor 204 may then examine the business listing cluster to determine whether the business listing cluster includes business information from a trusted source (Block 408).

When the business listing cluster includes business information from a trusted source, the processor 204 may then take a sample, random or otherwise, of the business listings for the business listing cluster (Block 410). In other words, the processor 204 examines the clustered business information to determine whether the business clusters include a business listing having either an authoritative source identifier and/or a provider source identifier that identifies a trusted authoritative source and/or a trusted providing source. In one embodiment, the processor 204 may sampling business listings from non-trusted (e.g., non-authoritative) sources. However, the sampling of the business listing for the clustered business may or may not include business listings from trusted sources (e.g., authoritative sources or providing sources).

The sampled business listings may then be transmitted or displayed to one or more moderators 110 for moderation (Block 412). After moderation, the processor 204 may then determine whether a number of the business listings resulted in a correction. A correction may include anything such as the removal to extraneous characters in a business name to the addition of a phone number in the business listing. In one embodiment, the processor 204 may consider only those business listings that had a serious correction to them, such as an identification that the business for the business listing is closed, the business for the business listing is non-existent, that the business for the business listing has an entirely different name, or other similar types of serious corrections.

The processor 204 may then determine whether the number of corrections to the business listings or the number of corrected business listings exceeded a correction threshold, such as 50% or the like (Block 414). In the event that the number of corrections (or the number of corrected business listings) exceeded the threshold, the temporary business configuration rule may then be converted into a permanent business listing configuration rule, such as by being incorporated into the business configuration rules 214 (Block 416).

Figure 5A:
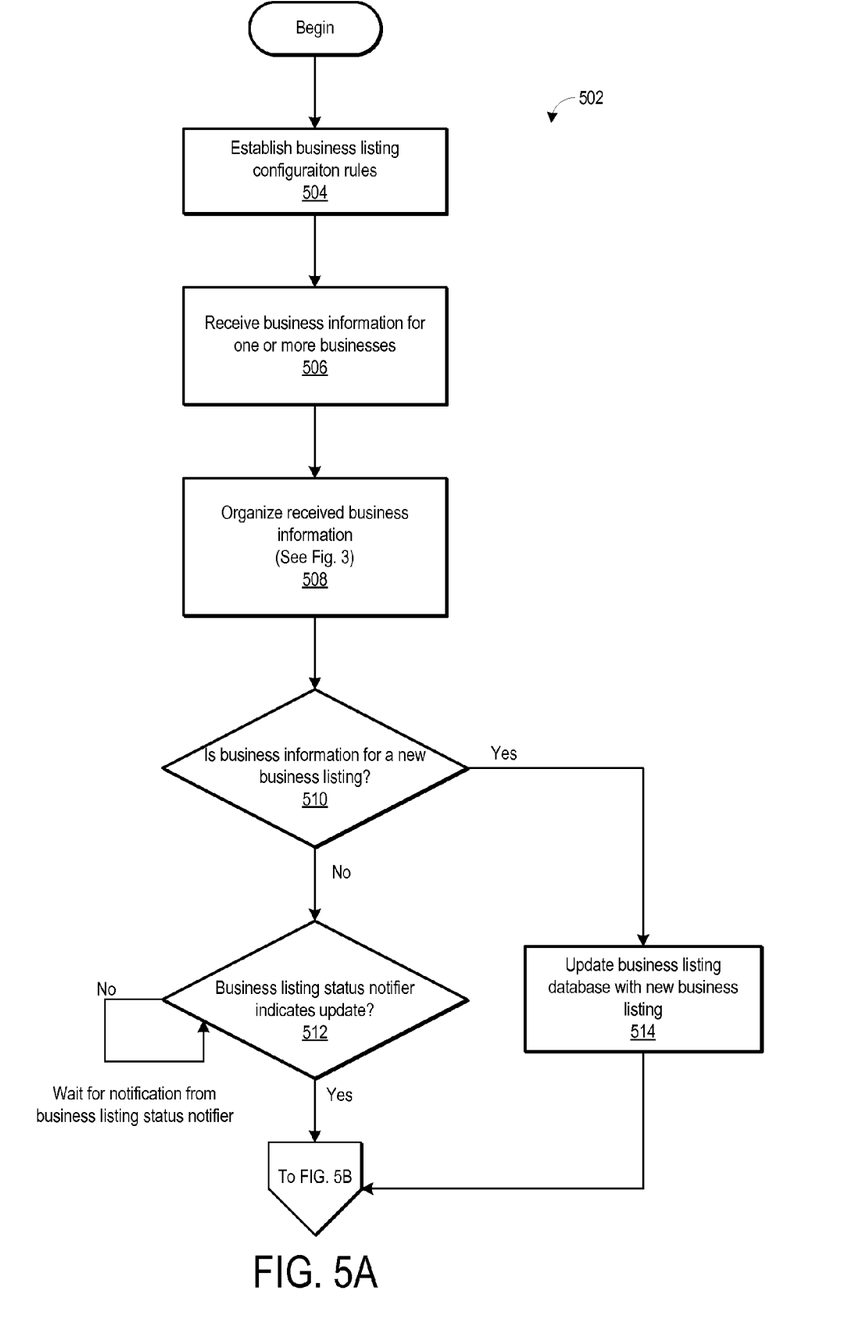
FIGS. 5A-5B illustrate one example of logic flow for identifying potentially suspicious business listings according to aspects of the invention.
Figure 5B:
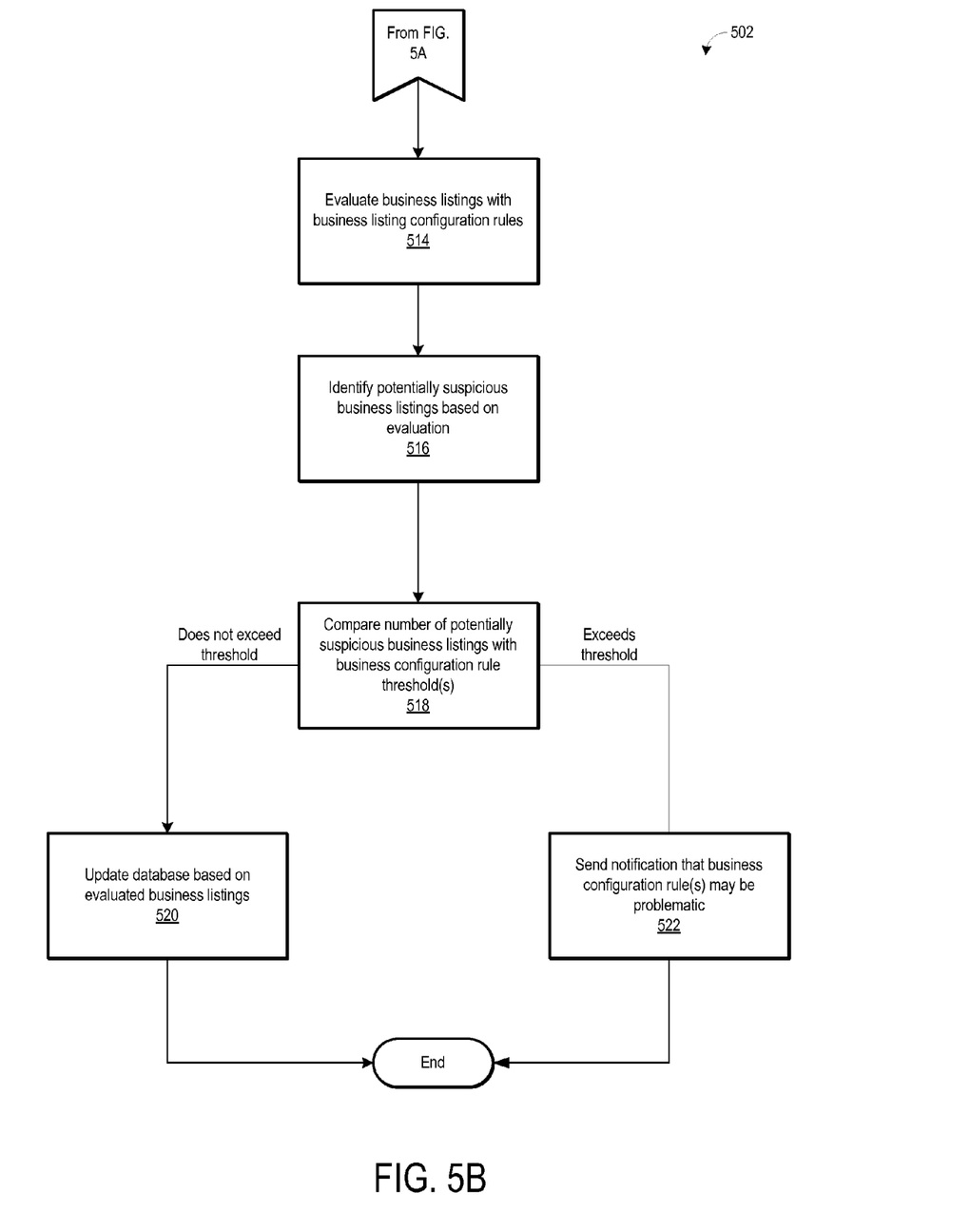

FIGS. 5A-5B illustrate one example of logic flow 502. Initially, one or more business listing configuration rules 214 are established in the business listing verification server 106 (Block 502). The business listing verification server 106 may then receive business information from the business information sources 104 (Block 504). As discussed previously, the business information from external business information sources 104 may be raw data or other data about a business. The processor 204 may then organize the business information received from the business information sources 104 (Block 508). As discussed previously, the organization of the business information received from the business information sources 104 may occur by leveraging the business information source pipeline 206 (See FIG. 3).

When the business information is received, the processor 204 (or a user of the business listing verification server 106) may decide whether the business information is for a new business listing or whether the business information is for updating a previously existing business listing (Block 510). Where the business information is for a new business listing, the processor 204 may create a business listing to be inserted into the business listing database 210 (Block 514). Where the received business information is for a previously existing business listing, the processor 204 may update the previously existing business listing accordingly. After updating the business listing database 210, the processor 204 may then change the status of the business listing status notifier 212 to indicate that the business listing database 210 has been updated (Block 512).

Referring next to FIG. 5B, when the status of the business listing status notifier 212 changes, the processor 204 may evaluate the business listings waiting in the business listing verification queue 216 (Block 514). As discussed previously, evaluating the business listings in the business listing verification queue 216 may include determining whether the business listings comply with one or more business listing verification rules 214. The processor 204 may determine which business listing configuration rule to apply to which business listings by comparing the business matching expression of the business listing configuration rule with the business listing.

When the processor 204 has identified a business listing configuration rule for a business listing, the processor 204 may then determine whether the business listing complies with the business listing configuration rule (Block 516). As discussed above, in one embodiment, the processor 204 may determine that the business listing does not comply with the identified business configuration rule when the business listing lacks an authoritative source identifier or is associated with an authoritative source identifier different than the source location associated with the identified business listing configuration rule. When the business listing does not comply with the business configuration rule, the processor 204 may identify the business listing as a potentially suspicious business listing. As discussed above, the processor 204 may also associate one or more business listing problems with the business listing identified as a potentially suspicious business listing.

The processor 204 may then determine whether the number of identified potentially suspicious business listings exceeds a threshold associated with an identified business listing configuration rule (Block 518). As discussed above, the threshold may be a percentage of business listings identified as potentially suspicious business listings (e.g., "90%") or may be a specific number of business listings identified as potentially suspicious business listings (e.g., "≥300"). Where the number of business listings identified as potentially suspicious business listings does not exceed the threshold, the processor 204 may update the business listing database 210 to identify that those business listings may have business listing problems (Block 520). The processor 204 may also update the moderation priority queue 208 based on the identified business listings. Updating the moderation priority queue 208 may include updating the priority for one or more business listings waiting to be moderated.

Furthermore, where the number of business listings identified as potentially suspicious business listings exceeds the threshold, the processor 204 may trigger an alert or send a notification that the business listing configuration rule associated with the threshold may be problematic (Block 522). The alert and/or notification may be transmitted to one or more of the moderators 110 to signal that the business listing configuration rule should be reviewed.

In this manner, the business listing verification server 106 facilitates an expeditious identification of potentially suspicious business listings. With the business listing configuration rules, the processor 204 may determine which of the business listings are potentially suspicious. In addition, because the business listing verification server 106 accounts for updated business information, the business listing verification server 106 may re-prioritize a business listing or even remove the business listing from the business listing database 210 based on whether the business listing has associated business listing problems. Thus, the flexibility of the business listing verification server 106 to consider updated business information in identifying a potentially suspicious business listing enhances the likelihood that a business listing will be properly identified.

The business listing verification server 106 described above may be implemented in a single system or partitioned across multiple systems. In addition, the memory 202 may be distributed across many different types of computer-readable media. The memory 202 may include random access memory ("RAM"), read-only memory ("ROM"), hard disks, floppy disks, CD-ROMs, flash memory or other types of computer memory.

The business listing database 210, the business information source pipeline 206, the business listing verification queue 216, and the moderation priority queue 208 may be implemented in a combination of software and hardware. For example, business information source pipeline 206, business listing verification queue 216, and/or the moderation priority queue 208 may be implemented in a computer programming language, such as C# or Java, or any other computer programming language now known or later developed. The pipeline 206 and the queues 208/216 may also be implemented in a computer scripting language, such as Javascript, PHP, ASP, or any other computer scripting language now known or later developed. Furthermore, the pipeline 206 and the queues 208/216 may be implemented using a combination of computer programming languages and computer scripting languages.

In addition, the business listing verification server 106 may be implemented with additional, different, or fewer components. As one example, the processor 204 and any other device or component may be implemented with a microprocessor, a microcontroller, a DSP, an application specific integrated circuit (ASIC), discrete analog or digital circuitry, or a combination of other types of circuits or logic. The business listing database 210, the pipeline 206, and the queues 208/216 may be distributed among multiple components, such as among multiple processors and memories, optionally including multiple distributed processing systems.

Logic, such as programs, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

The business listing database 210 may be stored as a collection of data. For instance, although the business listing database 210 is not limited by any particular data structure, the business listing database 210 may be stored in computer registers, as relational databases, flat files, or any other type of database now known or later developed.

The network 108 may be implemented as any combination of networks. As examples, the network 108 may be a Wide Area Network ("WAN"), such as the Internet; a Local Area Network ("LAN"); a Personal Area Network ("PAN"), or a combination of WANs, LANs, and PANs. Moreover, the network 108 may involve the use of one or more wired protocols, such as the Simple Object Access Protocol ("SOAP"); wireless protocols, such as 802.11a/b/g/n, Bluetooth, or WiMAX;

transport protocols, such as TCP or UDP; an Internet layer protocol, such as IP; application-level protocols, such as HTTP, a combination of any of the aforementioned protocols, or any other type of network protocol now known or later developed.

Interfaces between and within the business listing verification server 106 may be implemented using one or more interfaces, such as Web Services, SOAP, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. An apparatus for identifying potentially suspicious business listings for moderation, the apparatus comprising:
   a memory operative to store:
      a business listing database comprising a plurality of business listings; and
      a plurality of business listing configuration rules, each business listing configuration rule establishing whether a business listing is to be treated as a suspicious business listing; and
   a processor in communication with the memory, the processor being operative to:
      evaluate a selected business listing from the plurality of business listings with the plurality of business listing configuration rules;
      determine whether the selected business listing complies with a selected one of the plurality of business listing configuration rules, wherein:
         the selected business listing configuration rule comprises an authoritative source location;
         the authoritative source location identifies a trusted source of business information; and
         the processor is further operative to determine that the selected business listing does not comply with the selected business listing configuration rule when the selected business listing does not include the authoritative source location identified by the selected business listing configuration rule;
      identify the selected business listing as a potentially suspicious business listing when the business listing does not comply with the selected one of the plurality of the business listing configuration rules;
      assign the selected business listing a new business listing problem when the business listing is identified as being a potentially suspicious business listing but has not been previously assigned a business listing problem; and
      prioritize the selected business listing for moderation based on the assigned business listing problem to the selected business listing.

2. The apparatus of claim 1, wherein the processor is further operative to:
   update a moderation priority queue when the selected business listing is identified as a potentially suspicious business listing.

3. The apparatus of claim 1, wherein the processor is further operative to:
   remove the selected business listing from the business listing database when the selected business listing is not identified as being suspicious but has been previously assigned the business listing problem; and
   maintain the previously assigned business listing problem with the selected business listing when the business listing is identified as being the potentially suspicious business listing and the selected business listing was previously assigned the previously assigned business listing problem.

4. The apparatus of claim 1, wherein the selected one of the plurality of business listing configuration rules comprises a business matching expression for matching a business listing; and
   the processor is further operative to determine that the selected business listing is to comply with the selected business listing configuration rule when the selected business listing matches the business matching expression of the selected business listing configuration rule.

5. The apparatus of claim 1, wherein:
   the selected one of the business listing configuration rules includes a threshold; and
   the processor is further operative to transmit a threshold alert when a plurality of business listings having been identified as being potentially suspicious business listings exceed the threshold.

6. The apparatus of claim 5, wherein the threshold is a number of business listings that have been identified as being potentially suspicious business listings.

7. The apparatus of claim 5, wherein the threshold is a percentage of business listings that have been identified as being potentially suspicious business listings.

8. The apparatus of claim 5, wherein the threshold alert signifies that the selected business listing configuration rule is to be reviewed by a moderator.

9. The apparatus of claim 1, wherein the selected business listing is determined not to include the authoritative source location when the selected business listing includes a source location different than the authoritative source location.

10. A method for identifying potentially suspicious business listings for moderation, the method comprising:
    storing, in a memory, a business listing database comprising a plurality of business listings;
    establishing, in the memory, a plurality of business listing configuration rules, wherein each rule establishes whether a business listing is a trusted business listing; and
    evaluating, with a processor, a selected business listing of the plurality of business listings with the plurality of business listing configuration rules;
    determining, with the processor, whether the selected business listing complies with a selected one of the plurality of business listing configuration rules, wherein:
       the selected business listing configuration rule comprises an authoritative source location;
       the authoritative source location identifies a trusted source of business information; and
       the selected business listing is determined as not complying with the selected business listing configuration rule when the selected business listing does not include the authoritative source location identified by the selected business listing configuration rule;
    identifying the selected business listing as a potentially suspicious business listing when the selected business listing does not comply with the selected one of the plurality of the business listing configuration rules assigning the selected business listing a new business listing problem when the selected business listing is identified as being a potentially suspicious business listing but has not been previously assigned a business listing problem; and prioritizing the selected business listing for moderation based on the assigned business listing problem to the selected business listing.

11. The method of claim 10, further comprising:

updating a moderation priority queue when the selected business listing is identified as a potentially suspicious business listing.

12. The method of claim 10, further comprising:

removing the selected business listing from the business listing database when the selected business listing is not identified as being suspicious but has been previously assigned the business listing problem; and maintaining the previously assigned business listing problem with the selected business listing when the selected business listing is identified as being the potentially suspicious business listing and the selected business listing was previously assigned the previously assigned business listing problem.

13. The method of claim 10, wherein the selected one of the plurality of business listing configuration rules comprises a business matching expression for matching a business listing; and the method further comprises determining that the selected business listing is to comply with the selected business listing configuration rule when the selected business listing matches the business matching expression of the selected business listing configuration rule.

14. The method of claim 10, wherein the selected one of the business listing configuration rules includes a threshold; and the method further comprises transmitting a threshold alert when a plurality of business listings having been identified as being potentially suspicious business listings exceeds the threshold.

15. The method of claim 14, wherein the threshold is a number of business listings that have been identified as being potentially suspicious business listings.

16. The method of claim 14, wherein the threshold is a percentage of business listings that have been identified as being potentially suspicious business listings.

17. The method of claim 14, wherein the threshold alert signifies that the selected business listing configuration rule is to be reviewed by a moderator.

18. The method of claim 10, wherein the selected business listing is determined not to include the authoritative source location when the selected business listing includes a source location different than the authoritative source location.

\* \* \* \* \*